(12) United States Patent
Sørensen

(10) Patent No.: US 8,567,125 B2
(45) Date of Patent: Oct. 29, 2013

(54) PUSH-PULL CHAIN AND ACTUATOR

(75) Inventor: Jens Jørren Sørensen, København (DK)

(73) Assignee: VKR Holding A/S, Horsholm (DK)

( * ) Notice: Subject to any disclaimer, the term of this patent is extended or adjusted under 35 U.S.C. 154(b) by 398 days.

(21) Appl. No.: 12/491,812

(22) Filed: Jun. 25, 2009

(65) Prior Publication Data

US 2010/0011667 A1 Jan. 21, 2010

(30) Foreign Application Priority Data

Jul. 18, 2008 (EP) .................................... 08013012

(51) Int. Cl.
*E05F 11/04* (2006.01)
(52) U.S. Cl.
USPC ........................ 49/325; 49/324; 52/5; 52/78
(58) Field of Classification Search
USPC .............. 49/325, 324; 52/5, 78, 200; 59/5, 78
See application file for complete search history.

(56) References Cited

U.S. PATENT DOCUMENTS

| 1,873,619 | A | * | 8/1932 | Mojonnier | 219/150 V |
|---|---|---|---|---|---|
| 1,945,357 | A | * | 1/1934 | Pierce | 474/210 |
| 2,277,915 | A | * | 3/1942 | Klaucke | 474/210 |
| 3,716,986 | A | * | 2/1973 | Cork et al. | 59/78.1 |
| 3,911,802 | A | * | 10/1975 | Morden | 454/129 |
| 4,521,993 | A | * | 6/1985 | Tacheny et al. | 49/325 |
| 4,941,316 | A | | 7/1990 | Bechtold | |
| 4,945,678 | A | * | 8/1990 | Berner et al. | 49/322 |
| 5,140,806 | A | * | 8/1992 | Rohloff | 59/78 |
| 5,305,594 | A | * | 4/1994 | Wang | 59/85 |
| 6,302,818 | B1 | * | 10/2001 | Haight | 474/231 |
| 6,493,999 | B2 | * | 12/2002 | Lindgren et al. | 52/200 |
| 7,217,208 | B1 | * | 5/2007 | Sandro et al. | 474/230 |
| 2001/0022074 | A1 | * | 9/2001 | Shimaya | 59/84 |

* cited by examiner

*Primary Examiner* — Katherine Mitchell
*Assistant Examiner* — Marcus Menezes
(74) *Attorney, Agent, or Firm* — K. David Crockett, Esq.; Niky Economy Syrengelas, Esq.; Crockett & Crockett, PC

(57) ABSTRACT

A push-pull chain and actuator. The push-pull chain has lateral flexibility in two opposite directions. The actuator in which the chain is used can be mounted with either side of the chain up with substantially equally lateral flexing capacity. The push-pull chain bends sidewards in both opposing directions without being forced to assume a straight-line configuration.

7 Claims, 4 Drawing Sheets

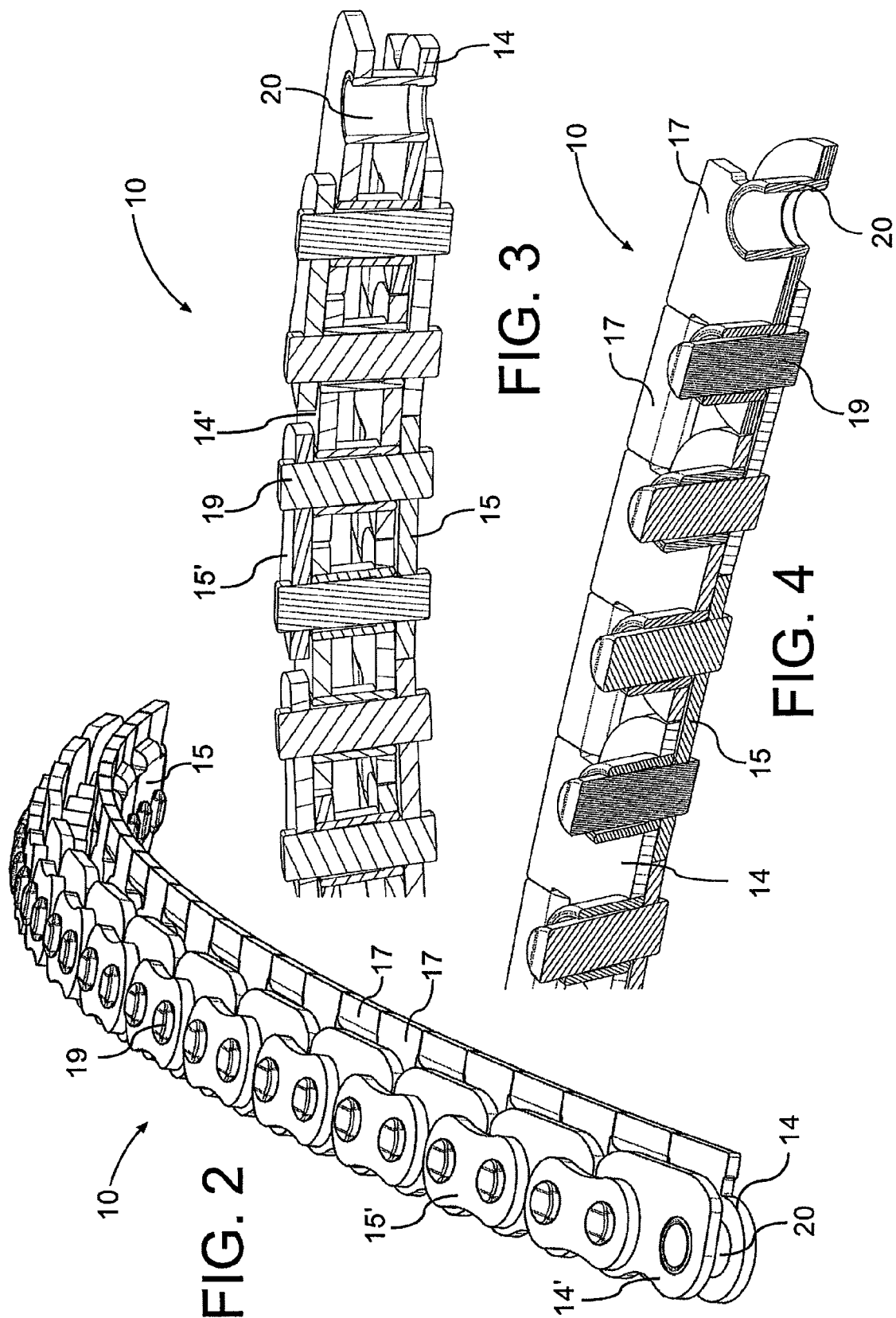

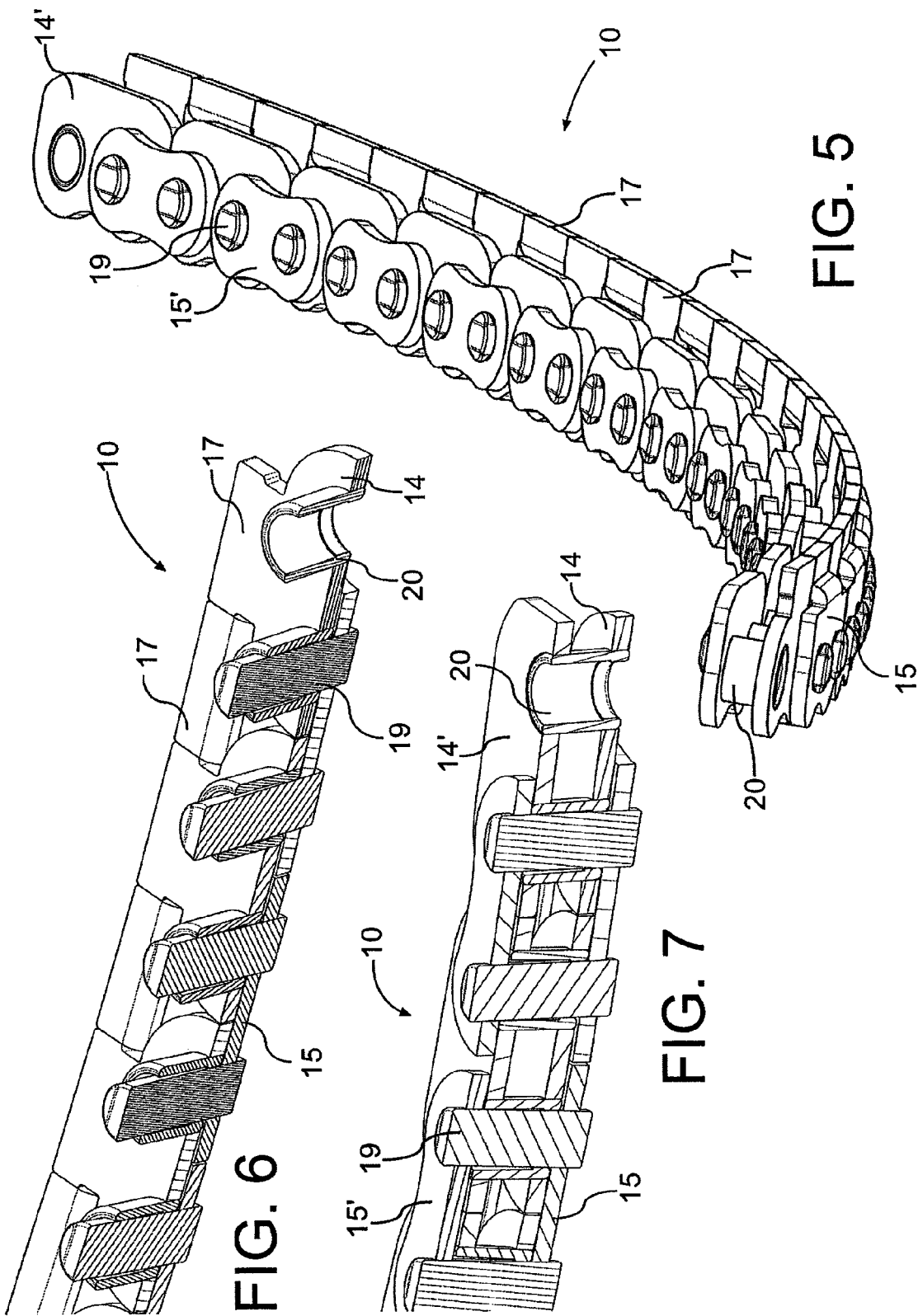

PUSH-PULL CHAIN AND ACTUATOR

This application claims priority to European Patent Application 08013012.3, filed Jul. 18, 2008.

FIELD OF THE INVENTIONS

The inventions described below relate to the field of to push-pull chains for use in actuators, in particular to push-pull used in window actuators. These actuators are designed to push windows with an assembled chain under compression and require that the assembled chain is capable of maintaining substantial structural rigidity and rectilinearity when extended to approximate a straight line and simultaneously provide a sufficient degree of lateral flexure. The invention also relates to an actuator that comprises such a push-pull chain.

BACKGROUND OF THE INVENTIONS

In order to be able to open a window the actuator must be capable of pushing the sash under compression rather than pull it under tension the chain links must be constructed to provide substantial rigidity for the chain when it is in a straight configuration, so that the chain can transmit force to the swinging window part for opening and closing thereof. The chain must also possess the requisite degree of lateral flexure to conform to the arcuate path traversed by swinging sash from the window frame.

U.S. Pat. No. 4,941,316 discloses a push-pull chain for use in a window or door actuator. This known chain comprises a series of links hinged together by pins, the links being provided with faces or lugs which abut in a manner to allow the chain to bending by rotation of the links about their hinges beyond a straight line in one direction only in a very limited extend, but which allow the chain to bend freely in the opposite direction.

Such a chain can transmit compression when the actuator is provided with suitable guides at one or both of its two ends, which guides urge the ends each over a length of one or more links into a configuration in which the chain is bended beyond a straight line with the lugs abutting with one another.

A chain of this known type may thus be employed to transmit both tension and compression round bends, by passing it over a suitable sprocket, it being understood that the bend round the pulley must be in the direction in which the chain is free to bend. A guide sheave, concentric with the pulley must be provided to prevent the chain being pushed off the sprocket when transmitting a compression load.

SUMMARY

A major challenge in the construction of window actuators is the desire to realize a slim actuator that is powerful and reliable. The actuators are required to be slim so that they can be integrated into the window frame or sash, as opposed to mounted onto the sash, which has been the practice for nearly all conventional actuators. Since there is a great amount of space in the direction parallel to the longitudinal extension of the window profiles the limitation in actuator length is usually not critical. However, the limitations posed by the space available inside the window frame in the traverse direction is very critical. Powerful and robust actuators require chains with a substantial cross sectional area, correspondingly large sprockets to drive the chain, transmissions with large gearwheels to transmit the required tongue, large electric drive motors to provide the required torque and effective chain guides at the chain exit to ensure the correct angle of the chain section extending from the chain exit. Each of these requirements tends to increase the traverse dimensions of the actuator housing, hence the dilemma. Therefore new window or door actuators and a chain for a window or door actuator that is slim, powerful and robust are needed.

This can be achieved by providing a push-pull chain for an actuator for opening and closing a swinging window or door, the chain comprising a plurality of pairs of inner links and outer links, alternate pairs of the inner links being sequentially coupled to alternate pairs of the outer links by parallel drive pins with bushings that separate the pairs of inner links and outer links, the drive pins are firmly received in holes in the outer links and the drive pins are rotatably received in the bushings, the inner links and the outer links on one side of the bushings are shaped to allow the chain to bend freely past a configuration in which the chain forms a straight line in one direction and only to a limited extent in the opposite direction, and the inner links and the outer links on the other side of the bushings allow the chain to bend freely past the configuration in the one direction and only to an extent in the opposite direction which extent is greater than the limited extent, and wherein the bushings and the drive pins at the one side are shaped and dimensioned to provide for an increased play or backlash between the drive pins and the hole in the bushings relative to the play or backlash between the drive pins and the hole in the bushings at the other side of the chain.

The capacity to bend sidewards (lateral flexure) is important when the chain is used to open and close a pivot hung window or door and the actuator is fixed to the frame or to the door or sash, i.e. in the actuator is not pivotally suspended. This fixation of the actuator is common and the relevant movement between the actuator and the frame requires the chain to bend sidewards. However, in conventional chains the sidewards bending of the chain forces the chain to assume a straighter or completely straight configuration. In a straight or close to straight configuration the chain may collapse in the direction in which it can freely bend. Thus, the stability of conventional push pull chains is reduced when they are bent sidewards.

By allowing the inner links and outer links on the other side of the bushings to bend in a greater extent past the configuration of a straight line the capacity of the chain to bend in one sideward direction is significantly improved and sidewards bending to a limited extent in the one direction does not force the chain to assume a more straight configuration.

The aspect feature that the bushings in the drive pins at the at least one side are shaped and dimensioned to provide for increased play or backlash significantly provides for the capacity of the chain to bend sidewards in the other of the directions, i.e. the chain is provided with lateral flexibility in two opposing directions.

By providing a chain that has lateral flexibility in two opposing directions the chain (and thus the actuator in which the chain is used) can be mounted with either side up with substantially equally lateral flexing capacity.

This allows the chain to bend sidewards in both directions without being forced/urged towards to assume a straight line thus being stable as the geometry of the chain is allowed to remain stable and not being pushed towards or past the configuration of a straight line in the one and other directions when bend sidewards.

The increased play or backlash is mainly in a driving direction of the chain.

The hole in the bushing at the one side of the chain may have an oblong shape.

The drive pin may have a reduced diameter at the one side of the chain.

The drive pin may have a reduced thickness at least in a driving direction of the chain at the one side of the chain.

The inner and outer links are and the drive pins and the bushings can be shaped to allow the chain to laterally flex in two opposite directions.

The drive pins or the holes in the bushings are stepped or tapering in the longitudinal direction of the drive pins and bushes.

The chain has an open back.

The chain may further have rollers on the bushings for reducing friction during operation in an actuator. This may be achieved by providing an actuator for opening and closing a window or a door comprising an elongated housing with a chain path leading to a transverse chain exit and a push-pull chain having a plurality pairs of inner links and outer links, alternate pairs of the inner links sequentially coupled to alternate pairs of the outer links by parallel drive pins (19) with bushings (20) that separate the pairs of inner links and outer links, the drive pins are firmly received in holes in the outer links and the drive pins are rotatably received in the bushings, the inner links and the outer links on at least one side of the bushings are shaped to allow the chain to bend freely past a configuration in which the chain forms a straight line in one direction and only to a limited extend in the opposite direction, and the inner links and the outer links on the other side of the bushings allow the chain to bend freely past the configuration in the one direction and only to an extent in the opposite direction which extent is greater than the limited extent, and wherein the bushings and the drive pins at the at least one side are shaped and dimensioned to provide for an increased play or backlash between the drive pins and the hole in the bushings relative to the play or backlash between the drive pins and the hole in the bushings at the other side of the chain.

Further objects, features, advantages and properties of the chains and actuators according to the invention will become apparent from the detailed description.

BRIEF DESCRIPTION OF THE DRAWINGS

FIG. 2 is an elevated view of the chain laterally flexed in an upward direction;

FIG. 3 is an elevated sectional view of the chain shown in FIG. 2;

FIG. 4 is an elevated and worked open sectional view of the chain shown in FIG. 2;

FIG. 5 is an elevated view of the chain laterally flexed in a downward direction;

FIG. 6 is an elevated sectional view of the chain shown in FIG. 2;

FIG. 7 is an elevated and worked open sectional view of the chain shown in FIG. 2;

DETAILED DESCRIPTION OF THE INVENTIONS

Figure 1:
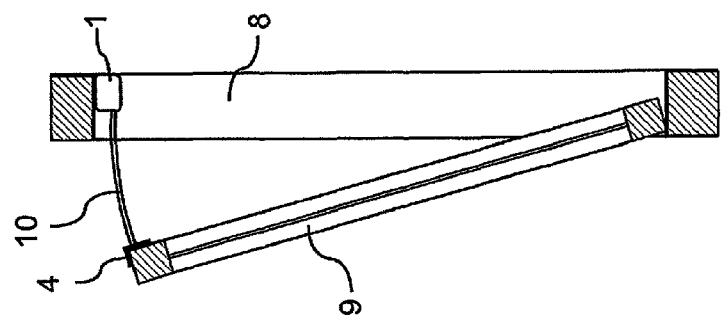
FIG. 1 is a cross-sectional view through a window frame profile and sash of a bottom hung window in an open position and showing a chain and an actuator according.

FIG. 1 illustrates a push-pull chain actuator 1. The actuator 1 is intended to be mounted in or on a window frame 8 (shown mounted on the frame 8). The window frame 8 holds a sash 9 to which the external extremity of the actuator chain 10 is connected. The actuator 1 can be embedded in a slot in a profile of the window frame 8 if desired. The external extremity of the chain 10 extending from the actuator 1 is fastened to a profile of the sash by means of a bracket 4. The chain is of the type that can bend freely beyond a straight line in one direction but only to a limited extent in the opposite direction. This type of chain is such well-known for push pull chain and actuators. The angular movement of the sash 9 forces the chain 10 to bend sidewards. Thus, a certain amount of sideward or lateral flexibility is required from the chain 10.

The chain 10 includes a plurality pairs of inner links 14,14' and outer links 15,15'. Alternate pairs of the inner links 14,14' are sequentially coupled to alternate pairs 15,15' of the outer links by parallel drive pins 19 with bushings 20 that separate the pairs of inner links 14,14'. The bushings 20 are firmly and non-slidably received in holes in the inner links 14,14'.

The inner links 14 and the outer links 15 on one side of bushings 20 are shaped to allow the chain 10 to bend freely past a configuration in which the chain forms a straight line in one direction and only to a limited extend in the opposite direction. The inner links 14' and the outer links 15' on the other side of the bushings 20 allow the chain 10 to bend in both directions. The inner links 14' and the outer links 15' on the other side of the chain 10 allow the chain 10 to bend freely past the configuration in one direction and only to an extent in the opposite direction which extent is greater than the limited extend allowed by the inner links 14 and 15 on the first side of the chain 10.

The inner links 14 and/or the outer links 15 that allow the chain to bend only to a limited extent are provided with lugs 17 that have abutment faces for abutment with the abutment faces of the lugs 17 of neighboring links 14,15 to limit the extent in which the chain 10 can be bend in the opposite direction.

The inner links 14' and the outer links 15' that allow the chain to freely bend on both directions are not provided with such lugs and the height of the chain 10 on the one side of the chain is therefore substantially lower than the height of the chain on the other side.

The inner links 14' on the other side have a reduced height that is less than the height of the inner links 14 that are provided with lugs for providing and increased bearing/contact surface for the inner side surface of the links 14'. The lugs 17 may be equally high on both sides of the chain 10, but their ends may spaced (there is space there between) so that the lugs one side of the chain will not abut when the chain is bend in the direction in which it can bend only slightly past the configuration of a straight line.

This side of the chain 10 with the links 14' and 15' that does not limit the freedom of movement of the chain can be easier pressed together than the links 14 and 15 on the other side of the chain 10, since there are no lugs that prevent the links 14' and 15' to move towards one another, as happened when the chain 10 is bend laterally in the direction shown in FIGS. 5-7. As mentioned above, this sideward flexibility is required to accommodate the curve between the tilted sash 9 and the window frame 8.

In this respect it is noted that sidewards bending of the chain is facilitated by a certain amount of play between the drive pins 19 and the bushings 20.

However, the chain actuator is in practice not always mounted in the same direction, and thus it is necessary for the chain to be able to flex sidewardly in the opposite direction show in FIGS. 2-4. Otherwise, it would be necessary to keep two types of chain actuators in stock with the chain mounted in a different orientation in each of the two types of actuators, and the skilled workers that install the actuators would need to keep track of the type of actuator in relation to the bending direction of the chain. This would unnecessarily increase production, logistics and increase the risk of the wrong type of actuator to be installed.

Therefore, the chain can also flex sidewardly in the direction shown in FIGS. 2-4.

In order to obtain this flexibility in the opposite direction, i.e. the direction shown in FIGS. 2-4, the pins 19 and the bushings 20 are on the side of the chain with the "normal" chain links 14' and 15' provided with an additional amount of play or backlash, in particular in the driving or longitudinal direction of the chain 10.

The additional play or backlash can be seen in FIGS. 3 and 4, which also illustrate the squint or slanting position of the driving pins 19 inside the hole in the bushings 20. The additional play or backlash in the driving direction allows the links 14' and 15' to move away from one another in a greater extend than with a normal play and thereby allow the chain 10 to bend to flex latterly to a substantial degree in the direction shown in FIGS. 2-4.

Figure 10:
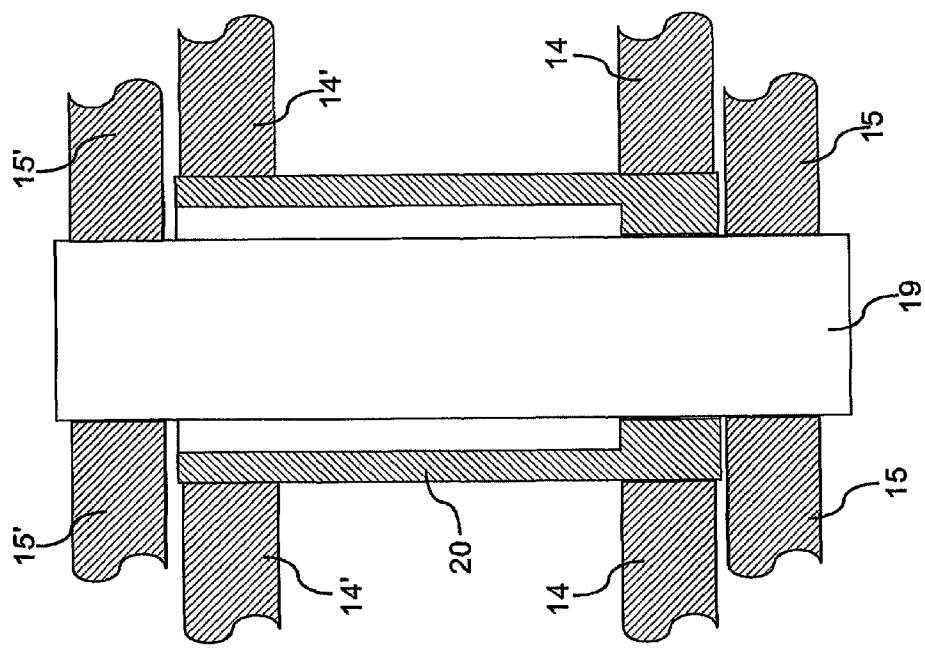
FIG. 10 is a sectional view through a bushing and a drive pin of the chain shown in FIGS. 2 to 7.
Figures 8, 9:
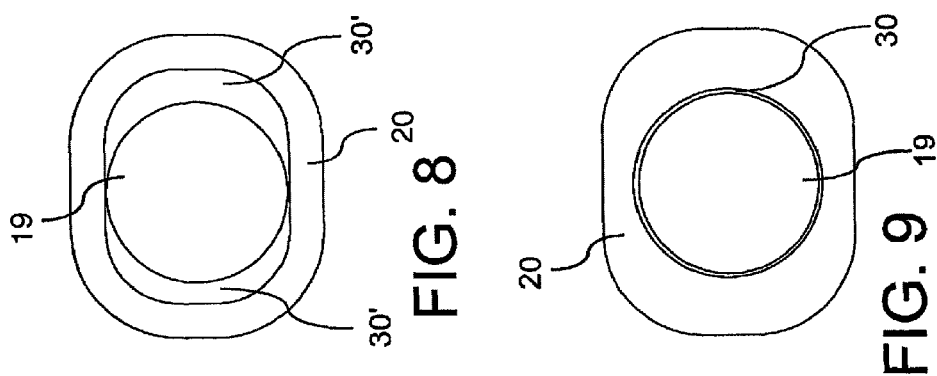
FIG. 8 is a front view on a bushing and a drive pin at the one side of the chain shown in FIGS. 2 to 7.
FIG. 9 is a front view on a bushing and a drive pin at the other side of the chain shown in FIGS. 2 to 7.

The construction of the bushings 20 and the driving pins 19 that allows for the lateral flexibility in the direction shown in FIGS. 2-4 is shown in greater detail in FIGS. 8-10. FIG. 8 is a side view on the driving pins 19 and the bushings 20 from the side of the chain that is provided with the links 14' and 15'. The bushings 20 are at this side of the chain provided with an oblong hole in which the driving pin 19 is received with a substantial amount of play or backlash 30', in particular in the driving direction of the chain. FIG. 9 is a side view on the driving pins 19 and the bushings 20 from the side of the chain with links 14 and 15. On this side of the chain the bushings 20 is provided with a circular hole and there is only a small or very small amount of play or backlash 30 between the driving pin 19 and the bushing 20 at this side of the chain 10.

The amount of play or backlash 30 is sufficient for allowing the driving pins 19 to assume a slightly squint position relative to the bushing 20. As can be seen in FIG. 10, the bushing 20 is provided along most of his links with the larger oblong hole and at its extremity near the links 14 and 15 provided with a substantially circular hole.

The lugs 17 that keep the chain 10 from bending in one direction are substantially arranged in one line and in the same plane as the narrow hole section in the bushing 20, so that the abutment force between the lugs 17 is disconnected from (has no influence on) the lateral flexing movement of the chain 10.

Figure 13:
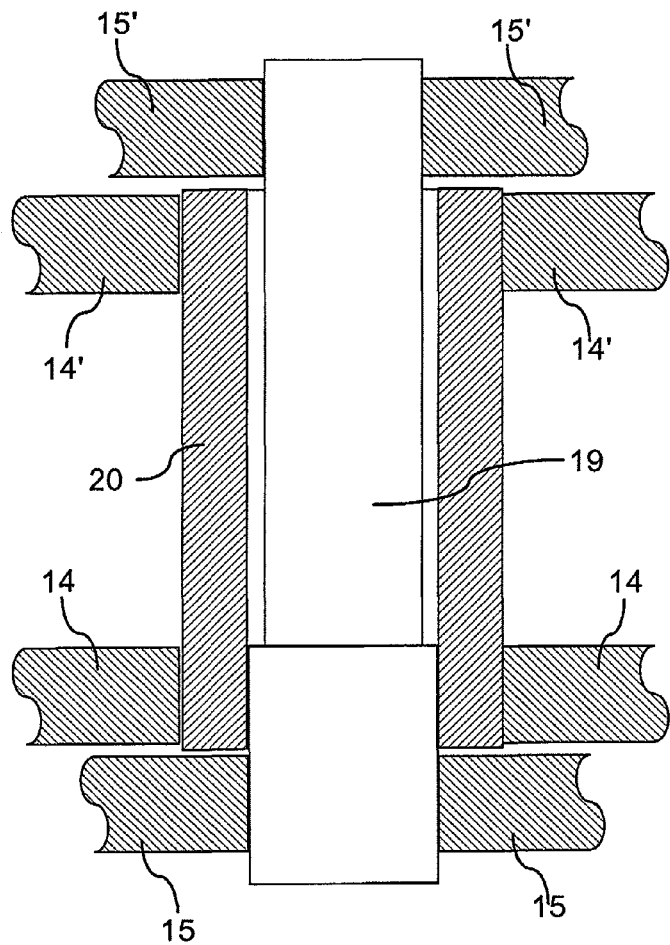
FIG. 13 is a sectional view through a bushing and a drive pin of the chain shown in FIGS. 11 and 12.
Figure 11:
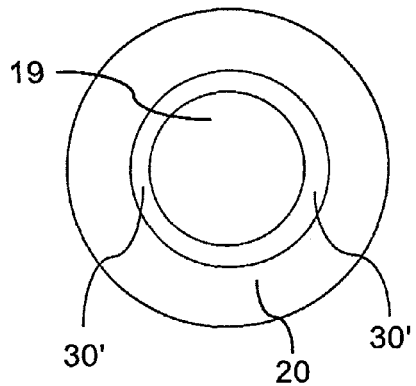
FIG. 11 is a front view on a bushing and a drive pin at the one side of the chain.
Figure 12:
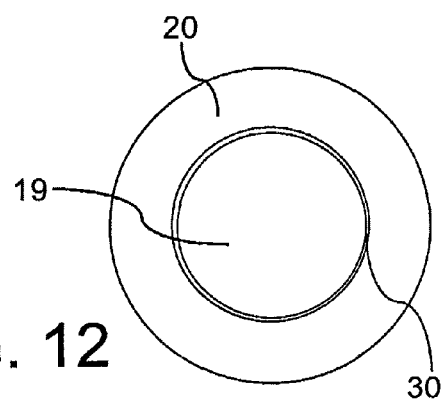
FIG. 12 is a front view on a bushing and a drive pin at the other side of the chain shown in FIG. 11.

FIGS. 11-13 illustrate that the additional flexibility of the chain in the direction shown in FIGS. 2-4 is also obtained by the provision of increased play between the driving pin 19 and the bushing 20 at the side of the chain of links 14' and 15'.

The bushing has a hole or bore with a substantially equal diameter along its length. The driving pin 19 has a larger diameter at the side of the chain 10 of the links 14 and 15 which fits with a small amount of play 30 into the bushing 20. The driving pin 19 is stepped in its longitudinal direction and most of its length is provided with a reduced diameter that provides for a substantial amount of play 30' at the side of the chain that is provided with the links 14' and 15'. This stepped shape allows the driving pin 19 to assume a squint position relative to the bushing 20 and thereby the links 14' and 15' are able to be urge away from one another to an increased degree.

The driving pin 19 can be tapered or the bore in bushing 20 can be tapered to create a larger amount of play or backlash between the driving pin 19 and the bushing 20 at the side of the chain with the links 14' and 15' than at the other side of the chain with the links 14 and 15.

The increased play or backlash 30' ensures that the chain 10 can bend laterally to a certain degree without the lugs 17 abutting one another to extend that pushes the chain 10 out of its optimal configuration for stability under a push load. The absence of lugs 17 on the other side of the chain 10 ensures that the chain can bend laterally to a certain degree in the opposite direction without being urged out of its optimal configuration for stability under a push load. The optimal configuration for stability under push load is when the chain 10 is slightly bend beyond a straight line in the direction in which its bending capacity is limited.

The shape of the holes in the bushings 20 with the increased play 30' relative to the driving pins 19 can be circular or oblong. An oblong hole allows for relative movement in the driving direction of the chain 10 while still keeping the links in place in directions perpendicular to the driving direction thus improving the stability of the chain while still allowing sideward bending.

It should also be noted that it is the relative size of the pin 19 and the hole in the driving direction that is important and the same effect could also be achieved by having a pin 19 of reduced size thus allowing for sideways bending without forcing the chain 10 from its configuration slightly beyond straight line.

The chain illustrated in FIGS. 2-13 is not provided with rollers. Accordingly the chain may be provided with rollers. The chain may be provided with pairs of rollers on each drive pin. The chain still has the same improved sidewards bending flexibility in one direction. The rollers can in an embodiment have equal diameter or be of different diameter. One of the rollers is engaged by the sprocket of the actuator in which the chain is used whilst the other roller of a pair of rollers engages a track that guides the chain around the sprocket.

Using rollers reduces friction losses whilst the use of double rollers provides for a further friction reduction.

The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

I claim:

1. A push-pull chain (10) having a driving direction for an actuator for opening and closing a swinging part of a window, door or other panel, said chain (10) comprising:

a plurality of pairs of oppositely placed inner links (14,14') and a plurality of pairs of oppositely placed outer links (15,15'), alternate pairs of said inner links (14,14') being sequentially coupled to alternate pairs (15,15') of said outer links by parallel drive pins (19) with bushings (20) that separate the pairs of inner links (14,14') and outer links (15,15'), with one link (14) of a pair of inner links and one link (15) of a pair of outer links being part of a first side of the push-pull chain and the other link (14') of the pair of inner links and the other link (15') of the pair of outer links being part of a second side of the push-pull chain, with said bushings between the links of said first side and the links of said second side and with said first side and said second side forming opposite sides of the push-pull chain;

said drive pins (19) being received in holes in said outer links (15,15') and said drive pins (19) being rotatably received in a hole in said bushings (20);

the inner links (14,14') and the outer links (15,15') on said first side and on said second side are shaped to allow the push-pull chain (10) to bend by pivoting of the links (14, 14', 15, 15') about the drive pins (19) past a configuration in which the chain forms a straight line in a first bending direction and the inner links (14) and the outer links (15) on said first side are shaped to only allow the push-pull chain to bend by pivoting of the links (14, 14', 15, 15') about the drive pins (19) to a limited extent in a second bending direction, opposite to said first bending direction past said configuration wherein said chain forms a straight line;

the inner links (14') and the outer links (15') on said second side of said bushings (20) allow the chain (10) to bend by pivoting of the links (14, 14', 15, 15') about the drive pins (19) past said configuration only to a certain extent in said second bending direction, wherein said certain extent is greater than said limited extent; and a play or backlash in said driving direction between the drive pins (19) and the hole in the bushings (20) at said second side is greater than a play or backlash between the drive pins (19) and the hole in the bushings (20) at said first side to allow said chain to laterally flex in two opposite flexing directions with said two opposite flexing directions being substantially perpendicular to said first bending direction and said second bending direction respectively.

2. A push-pull chain according to claim 1, wherein the hole in said bushing (20) at said opposite side of the chain (10) has an oblong shape.

3. A push-pull chain according to claim 1, wherein said drive pin (19) has a reduced diameter at said second side of the chain (10).

4. A push-pull chain according to claim 1, wherein said drive pin has a reduced thickness at said second side of the chain (10).

5. A push-pull chain according to claim 4, wherein said inner (14, 14') and outer links (15,15') and the drive pins (19) and the bushings (20) are shaped so as to allow said chain (10) to laterally flex in two opposite lateral directions of said chain.

6. A push-pull chain according to claim 5, wherein said drive pins (19) or said holes in said bushings (20) are stepped or tapering in the longitudinal direction of the drive pins (19) and bushing (20).

7. An actuator for opening and closing a swinging part of a window, a door or other panel comprising:
    an elongated housing with a chain path leading to a transverse chain exit and
    a push-pull chain (10) according to claim 1.

\* \* \* \* \*